United States Patent [19]
Klein et al.

[11] Patent Number: 6,008,887
[45] Date of Patent: Dec. 28, 1999

[54] SINGLE BEAM LASER SURFACE VELOCITY AND DISPLACEMENT MEASUREMENT APPARATUS

[75] Inventors: Marvin B. Klein, Pacific Palisades; Gerald D. Bacher, Santa Ana, both of Calif.

[73] Assignee: Lasson Technologies, Inc., Culver City, Calif.

[21] Appl. No.: 09/045,076

[22] Filed: Mar. 20, 1998

[51] Int. Cl.$^6$ .................................................. G01B 9/02
[52] U.S. Cl. ...................... 356/28.5; 356/356; 73/597; 73/601
[58] Field of Search ............... 356/28, 28.5, 356; 73/597, 601

[56] References Cited

U.S. PATENT DOCUMENTS

| | | | |
|---|---|---|---|
| 4,659,224 | 4/1987 | Monchalin | 356/352 |
| 5,229,832 | 7/1993 | Gaynor | 356/360 |
| 5,301,003 | 4/1994 | Ikeda | 356/73 |
| 5,404,224 | 4/1995 | Kotidis et al. | 356/351 |
| 5,426,498 | 6/1995 | Brueck et al. | 356/35.5 |
| 5,457,997 | 10/1995 | Naruo et al. | 73/643 |
| 5,608,166 | 3/1997 | Monchalin et al. | 73/657 |
| 5,684,592 | 11/1997 | Mitchell et al. | 356/357 |

OTHER PUBLICATIONS

Vignola et al SPIE vol. 2868 Sep. 1996.
Korneev et al Optik vol. 102 No. 1 1996.
Korneev et al Optics Com 115 1995.
Sokolov & Stepanov Applied Optics vol. 32 No. 11 Apr. 1993.
Korneev & Stepanov J. Mod Optics vol. 38 No. 11 1991.
Sokolov et al Sov Phys Accoust V37 N5 Sep. 1991.
Stephanov et al Optics Ltrs V15 N21 Nov. 1990.
Petrov et al J. Appl Phys V68 N5 Sep. 1990.
Monchalin et al J Nondes Eval V8 N2 1989.
McKie & Wagner Appl Phys Lett V53 N12 Sep. 1988.

*Primary Examiner*—Stephen C. Buczinski
*Attorney, Agent, or Firm*—Walter A. Hackler

[57] ABSTRACT

Single-beam laser apparatus for measuring surface velocity at acoustic frequencies and surface displacement at ultrasonic frequencies includes a source laser and optics for directing a single laser beam at normal incidence to a surface. A photo EMF detector and optics are provided for directing surface reflected laser beam at the photo EMF detector in order to provide outputs therefrom which are directly proportional to all three orthogonal components surface velocity or displacement.

18 Claims, 5 Drawing Sheets

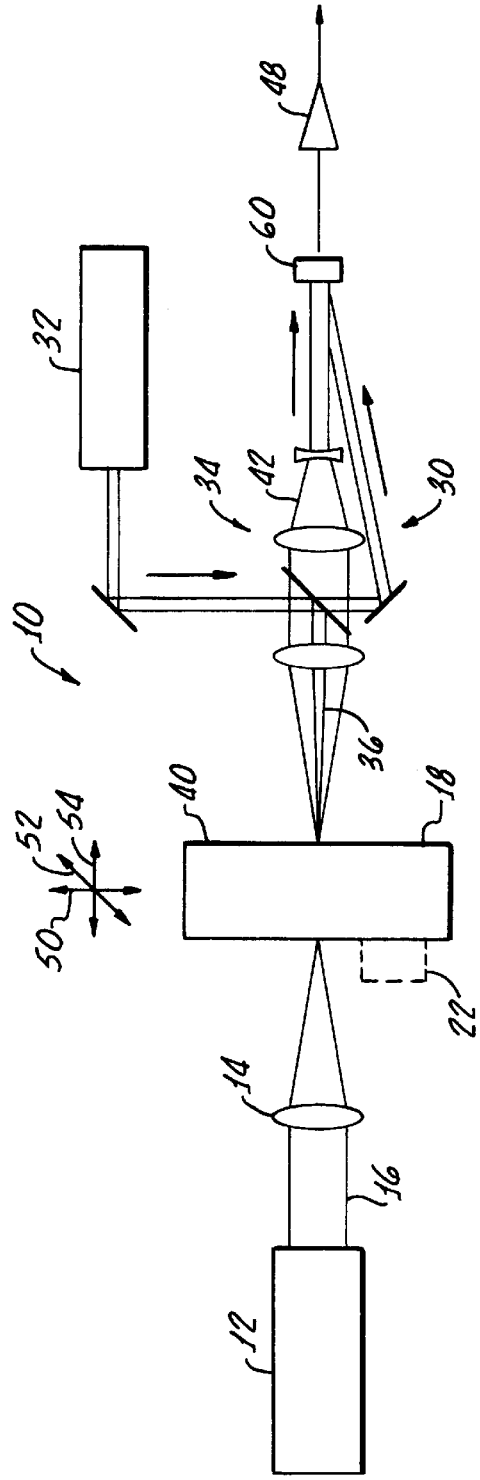
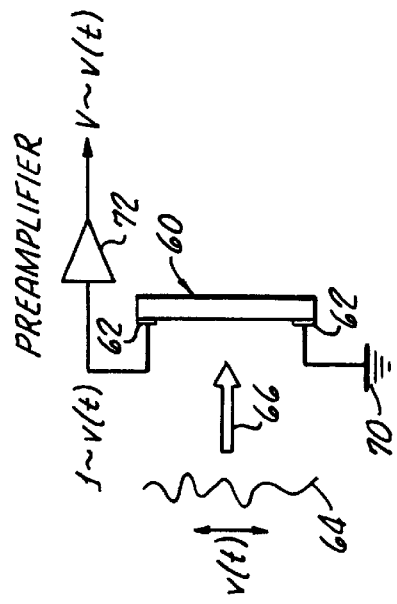
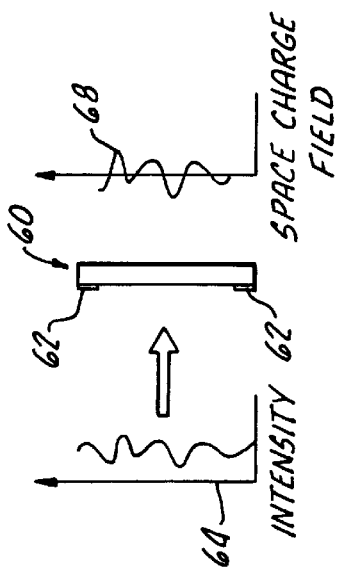
FIG. 1.
FIG. 2a.
FIG. 2b.

SINGLE BEAM LASER SURFACE VELOCITY AND DISPLACEMENT MEASUREMENT APPARATUS

This invention was made with Government support under Contract N00167-97-4010 awarded by the Naval Surface Warfare Center, Carderock Division. The Government has certain rights in the invention.

The present invention generally relates to an apparatus and method for measurement of in-plane and out-of-plane surface velocity or displacement in materials. More particularly, the present invention is directed to an instrument and method for measuring all three components of surface displacement or velocity of a solid utilizing a single probe laser beam.

The measurement of surface vector displacement, velocity or acceleration in a material is useful in determining the properties of material. For example, at acoustic frequencies, between about 10 Hz and about 20 kHz, surface motion is produced by whole body vibrations, or vibrational modes, e.g., torsion and bending, of the body. At ultrasonic frequencies, for example, above 100 kHz, local surface motion is produced by the arrival of compression waves, shear waves, surface waves or plate waves.

At low frequencies an instrument, utilizing the principles of photo-EMF detection, can provide an output signal directly proportional to the surface velocity and at high frequencies, such an instrument can provide an output signal directly proportional to surface displacement.

Historically, conventional contact accelerometers have been used for measuring effective acceleration of solid parts with velocity and displacement being obtained by integration. Unfortunately, the physical connection of these devices with the surface being tested causes a loading thereof which frequently influences the motion of the very surface under examination. Further, such accelerometers are sensitive to temperature fluctuation and must be calibrated because of the variance in accelerometer characteristics. Finally, prior art accelerometers have limited spatial resolution.

Lasers have now been utilized for the measurement of displacement, velocity or acceleration, because they do not load the surface under examination or otherwise interfere with the surface motion under investigation. Further, laser devices can be utilized to scan large areas of a surface being studied as opposed to the slower local examination necessitated by the use of contact devices.

With low frequency surface vibration due to external or internal mechanical agitation of a surface, laser optical interferometric methods can be used to determine surface velocity.

In addition, a laser can also be utilized to generate ultrasound in an object, or surface under study. Pulsed laser illumination of a surface provides an ultrasonic impulse originating at the point of illumination. Surface motion optical interferometric detection of ultrasonic vibration can be utilized to measure material parameters such as thickness, grain structure and temperature and to detect defects such as cracks, voids and porosity.

As is well known, when a material is essentially homogeneous, measurements of the velocity and attenuation of longitudinal, surface and shear ultrasonic waves can be used to determine the bulk elastic properties of the material, for example, Young's modulus and shear modulus. This velocity and attenuation is determined from measurements of out-of-plane surface displacements, in-plane surface displacement or a combination thereof.

In general, optical interferometric detection of surface displacements at ultrasonic frequencies is based upon the detection of changes of phase in one arm of a dual-beam interferometer. An interferometric arrangement is called homodyne if the reference wave and the signal wave are at the same frequency and heterodyne if one of the waves is offset in frequency with respect to the other.

At either low or high frequency, interferometers are sensitive to surface movement along the direction of a probe laser beam. The orientation of this beam with respect to the surface normal determines the admixture of in-plane and out-of-plane motion that is measured. In most cases the probe laser is directed along a surface normal, so only out-of-plane motion is detected.

Conventional reference-beam interferometers with coherent detection typically operate most effectively on a mirror-like surface or a single speckle from a diffuse surface. Unfortunately, this limits the versatility of such instruments.

By contrast, time-delay interferometers can process speckled return signals, but they have a limited band-width and a restricted range of operating frequencies. Further, both reference beam and time delay interferometers require path length stabilization or the use of electronic post-processing demodulation circuits.

The hereinabove referenced instruments can isolate the out-of-plane component of surface motion, at normal incidence, however, a single such instrument cannot be configured to isolate the in-plane component.

Accordingly, for measurement of the in-plane component, a number of dual-beam techniques have been developed. Such devices, unfortunately, are sensitive to the changes in longitudinal position and can only measure motion along one in-plane direction.

In addition, concomitant with the use of dual beams is a strict requirement that the two probe beams intersect at a selected location on the surface under investigation.

For homodyne operation, separate beams may be utilized or a lens may be utilized to cast two probe beams from a single source at equal and opposite angles to a test surface normal utilizing the detection of a return signal along the surface normal. As portions of the surface move laterally in and out of the illuminated portions of a fringe pattern, the return light is amplitude modulated. The velocity is determined from the measured frequency of the modulation and the known spatial period of the interference pattern.

For heterodyne operation, one of the two probe beams may be frequency shifted using an acousto-optic Bragg cell. In this case, heterodyne detection is used to determine the modulation frequency.

In another interpretation, the return beam in this system may be considered as a superposition of the two scattered probe beams. Each scattered beam is Doppler shifted by an amount determined by the velocity of in-plane motion (in the plane of the two probe beams) and the angle of incidence. Upon coherent detection, the difference frequency yields the in-plane velocity. If one probe beam is frequency shifted, then heterodyne detection can be used as hereinabove noted.

The present invention utilizes a photodetection mechanism with a single, normal-incidence probe beam and a single return beam along the line of sight for the measurement of all three orthogonal components of surface velocity at acoustic frequencies or displacement at ultrasonic frequencies. A photo-EMF detector, hereinabove noted, provides an output that is directly proportional to surface velocity, or displacement, with a normalization factor that can be easily determined. Although signal amplification is necessary, no other post-processing electronics are required. Further, the associated optical system in accordance with the present invention does not require a path length stabilization or frequency shifting devices. It can also process speckled beams scattered from non-specular surfaces.

SUMMARY OF THE INVENTION

Single beam laser apparatus, in accordance with the present invention, is suitable for measuring surface velocity at acoustic frequencies and surface displacement at ultrasonic frequencies. Generally the apparatus includes means for producing surface motion at acoustic or ultrasonic frequencies at a surface, along with means for directing a single probe laser beam at a selected incident angle to the surface.

At least one photo-EMF detector is provided with means for directing a surface scattered laser beam to the photo-EMF detector in order to enable the photo-EMF detector to provide output signals therefrom which are directly proportional to a component of surface in-plane velocity when the surface vibrates at acoustic frequencies. When the surface vibrates at ultrasonic frequencies, the detector provides output signals directly proportional to a component of surface in-plane displacement. Importantly, the directed scattered laser beam is aligned with the incident probe laser beam. Additionally, the single laser beam may be directed at normal incidence to the surface.

More particularly, the apparatus may include a photo-EMF detector having a detector surface with two pairs of opposing electrode means which are disposed orthogonally to one another. This unique arrangement enables the single detector to provide output signals proportional to two orthogonal components of in-plane surface velocity or displacement, depending upon the excitation frequency of the surface.

In addition, the apparatus may include a second photo-EMF detector along with optic means for directing a portion of the laser beam at the second EMF detector, (along with the scattered laser beam) for providing a plane wave reference in order to enable the second detector to output a signal directly proportional to out-of-plane surface velocity at acoustic frequencies, or, out-of-plane surface displacement at ultrasonic frequencies.

In another embodiment of the present invention, the hereinabove referenced photo-EMF detector having two pairs of electrode means may be replaced by a first and a second photo-EMF detector, each having opposing electrode means for providing an output signal directly proportional to orthogonal in-plane components of velocity or displacement.

In this embodiment, a third photo-EMF detector may be provided along with optic means for directing a portion of the second laser beam at the third photo-EMF detector (along with the scattered laser beam) for providing a plane-wave reference in order to enable the third detector to output a signal directly proportional to out-of-plane surface velocity or displacement.

Importantly, in accordance with the present invention, the third detector may be placed at a plane (Fourier plane) which is a Fourier transform plane, defined by the optic means, of the surface of the sample. This arrangement has been unexpectedly found to reduce interfering in-plane signals in the detector.

In this embodiment the means for directing a surface scattered laser beam into the first and second EMF detectors includes an optical lens and the first and second photo-EMF detectors are disposed at a plane (image plane) which is an image plane, defined by one optic means, of the surface of the sample. The motion of the speckle pattern at the photo-EMF detector (image plane) can be amplified if the imaging optical system is configured to provide magnification.

The hereinabove referenced single beam laser apparatus is useful for simultaneously measuring all three orthogonal components of surface velocity on the surface when vibrating at acoustic frequencies, and all three orthogonal components of surface displacement when the surface is vibrating at ultrasonic frequencies.

Alternatively, single beam laser apparatus in accordance with the present invention may sequentially measure in-plane surface velocity or displacement and out-of-plane surface velocity and displacement. This embodiment includes means for directing a single laser beam at selected incidence to a surface and a photo-EMF detector having outputs directly proportion to the surface velocity at acoustic frequencies and output directly proportional to the surface displacement at ultrasonic frequencies. Means for directing a scattered laser beam at the photo-EMF detector is provided along with optic means for directing a portion of the single laser beam at the photo-EMF detector for providing a plane-wave reference thereto in order to enable the photo-EMF detector to output a signal directly proportional to out-of-plane surface velocity or displacement.

Importantly, switch means are provided for optically blocking the reference beam portion in order to enable the photo-EMF detector to output signals directly proportional to two orthogonal components of in-plane surface velocity or displacement.

Further, in order to optimize detector efficiency, second optic means may be provided and disposed in a position intercepting the surface scattered laser beam for alternatively forming an image plane at the photo-EMF detector and a Fourier plane at the photo-EMF detector.

In combination therewith, control means are provided for operating the switch means and the second optic means in order to form a Fourier plane at the photo-EMF detector while optically blocking the laser beam portion and forming an image plane at the photo-EMF detector while not blocking the laser beam portion.

In this embodiment the photo-EMF detector includes a detector surface, having two pairs of opposing electrode means, disposed orthogonally, for providing signals directly proportional to two orthogonal components of in-plane surface velocity or displacement. Each of the electrode means may include two electrodes attached to a photo-EMF surface in a spaced-apart relationship and facing one another.

BRIEF DESCRIPTION OF THE DRAWINGS

The advantages and features of the present invention will be better understood by the following description when considered in conjunction with the accompanying drawings, in which:

FIG. 1 is a general schematic of single probe beam laser apparatus in accordance with the present invention for measuring surface velocity at acoustic frequencies and surface displacement at ultrasonic frequencies;

FIG. 2A is a representation of a photo EMF detector and the generation of a lateral space charge field therein by incoming spatial intensity pattern of laser light;

FIG. 2B is a diagram similar to FIG. 2A showing the photo EMF detector in connection with a preamplifier in order to provide current generation which is directly proportional to the lateral velocity or displacement of the incoming spatial intensity pattern;

DETAILED DESCRIPTION

Figure 3:
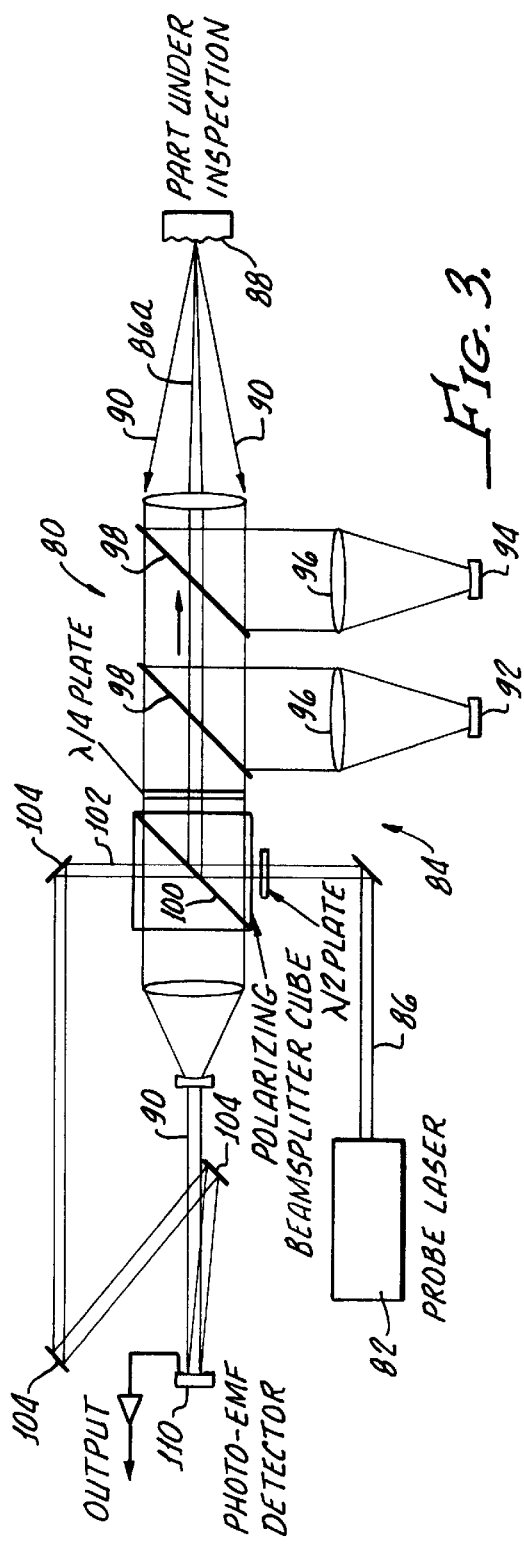
FIG. 3 is a schematic diagram of one embodiment of the invention utilizing a single probe laser beam and three photo EMF detectors for providing outputs which are directly proportional to all three orthogonal components of surface velocity, or displacement.

Turning now to FIG. 1, there is shown laser apparatus 10 suitable for surface inspection.

At ultrasonic frequencies, a pulsed laser 12 and lens system 14 may be used to focus a laser beam 16 on to a sample, or object under test, 18 for generation of ultrasound therein. Alternatively, a transducer 22, shown in dashed lines, may be used to generate low frequency (acoustic) sound into the object 18 under test in a conventional manner. Such low frequencies may also occur within the test object 18 by operation of associated apparatus, not shown, connected to the test object 18.

Any suitable pulsed laser 12 may be utilized such as, for example, a Nd:YAG laser as available from Big Sky Lasers, Model CFR 400, which can generate a full complement of ultrasonic waves, including compression, shear, surface and plate. Particularly large wave amplitudes are observed when the laser generation is allowed to ablate a thin layer of material from the incident surface.

The distinct advantage of the laser apparatus 10 utilizing the pulsed laser 12, as opposed to a conventional transducer 22 is the fact that the laser apparatus 10 and pulsed laser 12 are remote, i.e., no physical contact with the word piece 18 is required, thus allowing inspection of parts at high temperature or hazardous environments.

A single beam laser surface velocity and displacement apparatus 30 in accordance with the present invention includes a probe laser 32, optics 34, which provides a means for directing a single laser beam 36 at a selected incidence to a surface 40 of the object 18 and for directing a surface reflected laser beam 42 at a photo EMF detector means 60 which provides outputs to an amplifiers 48, which are directly proportional to all three orthogonal components of surface velocity at acoustic frequencies and surface displacement at ultrasonic frequencies. As shown in FIG. 1 the selected incidence to the surface 40 may be normal.

In FIG. 1 arrows 50, 52 represent orthogonal in-plane surface velocities or displacement and arrow 54 represents orthogonal out-of-plane surface velocity or displacement. The optics 34 may be of any conventional type and any suitable probe laser 32 may be utilized.

Importantly, the apparatus 30 in accordance with the present invention includes a photo detector 60 which utilizes a mechanism known as the non-steady state photo-electromotive force (photo-EMF). The physics of this photo EMF have been investigated by Stepanov, and others, as set forth in the following references:

1. M. P Petrov, S. I Stepanov, G. S. Trofimov, "Time-varying EMF in a nonuniformly illuminated photoconductor," Sov.Tech.Phys.Lett. 12, 379–381 (1986).
2. M. P. Petrov, I. A. Sokolov, S. I. Stepanov, G. S. Trofimov, "Non-steady-state photo-EMF induced by dynamic gratings in partially compensated photoconductors." J.Appl. Phys. 68, 2216–2225 (1990).
3. S. I. Stepanov, I. A. Sokolov, G. S. Trofimov, V. I. Vlad, D. Popa and I. Apostol, "Measuring vibration amplitudes in the picometer range using moving light gratings in photoconductive GaAs:Cr." Opt.Lett. 15 1239–1241 (1990).
4. S. Stepanov, "Sensitivity of non-steady-state photoelectromotive force-based adaptive photodetectors and characterization techniques", Appl. Opt. 33, 915–920 (1994)
5. I. A. Sokolov, S. I. Stepanov and G. S. Trofimov, "Detection of small vibrations of diffusely scattering objects by means of adaptive photodetectors," Sov. Phys. Acoust. 37, 519–521 (1991).
6. N. A. Korneev and S. I. Stepanov, "Measurement of small lateral vibrations of speckle patterns using a nonsteady-state photo-EMF in GaAs:Cr" J Mod. Opt. 38, 2153–2158 (1991).
7. N. Korneev and S. Stepanov "Measurement of Different Components of Vibrations in Speckle Referenceless Configuration using Adaptive Photodetectors" Optics Commun. 115, 35–39 (1995).

These references are to be incorporated herewith in toto for describing the photo EMF detectors suitable for use in the present invention.

Briefly, the photo EMF detector 60 resembles a conventional semiconductor detector; however, it can develop an internal lateral electric field that stores the spatial intensity pattern of an incident beam. (See FIG. 2A). In FIG. 2A, the detector 60 is shown with surface electrodes 62 along with an intensity pattern 64 of an incident laser beam 66 with the resulting lateral internal space charge field 68 developed in the material between the electrodes 62. The detector 60 may have a gallium arsenide substrate with titanium/gold electrodes 62.

When the incident pattern 64 moves or vibrates laterally, the stored spaced charge field drives a current that is proportional to velocity at low (acoustic) frequencies and to displacement at high (ultrasonic) frequencies through the electrical contacts 62 when interconnected to a circuit including a ground 70 and amplifier 72.

Upon incidence on the detector of the reflected beam, photo-generated carriers are produced which diffuse away from regions of intense optical radiation. These carriers become trapped and form a periodic charge pattern and a corresponding periodic space-charged field. For transport by diffusion only, the periodic space charge field is spatially shifted by 90° normal to the intensity pattern. In the absence of any change in the optical pattern, a space charge field builds up to oppose the charge diffusion and no net current is produced. If the surface moves longitudinally, as represented by the arrow 52 in FIG. 1, the resultant phase change induces lateral motion of the incident intensity fringe pattern about some equilibrium value. If the motion is sufficiently rapid, the space charge field cannot track the oscillations and a current is produced.

Turning now to FIG. 3 there is shown apparatus 80 which includes a probe laser 82 and optics 84 for directing a single laser beam 86 onto a surface 88 with the incident laser beam 86a shown normal to the surface 88. It should be appreciated that the incident laser beam 86a need not be normal to the surface, but at an angle thereto. In this case the scattered laser beam 90 is directed to the photo EMF detector 92, 94 from the surface 88 along the same path (i.e., at the same angle) as the incident beam 86a. A scattered laser beam 90 is directed into photo EMF detectors 92, 94. The optics 84 may be of any conventional type which includes lenses 96 and beam splitters 98.

In addition, a splitter 100 may be provided for transmitting a portion 102 of the laser beam 86 by way of a mirrors 104 as a plane wave reference to a photo-EMF detector 110 (along with scattered beam 90) in order to enable the detector to provide an output directly proportional to out-of-plane surface velocity or displacement.

Figure 4:
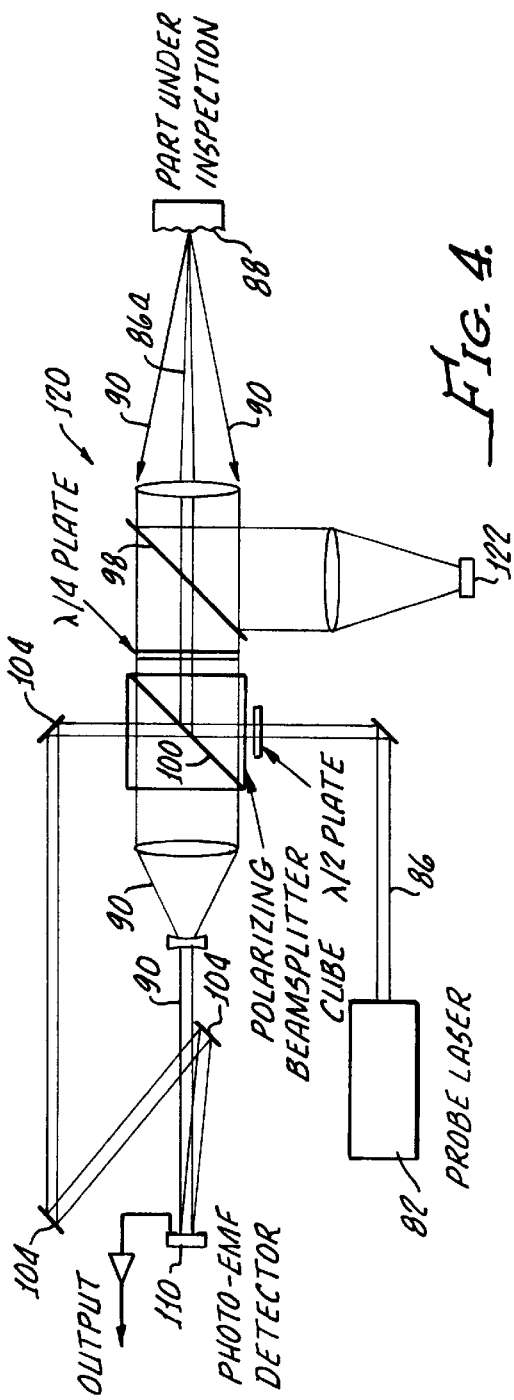
FIG. 4 is a schematic diagram of another embodiment of the present invention utilizing two photo EMF detectors for providing orthogonal components of surface velocity or displacement.
Figure 5:
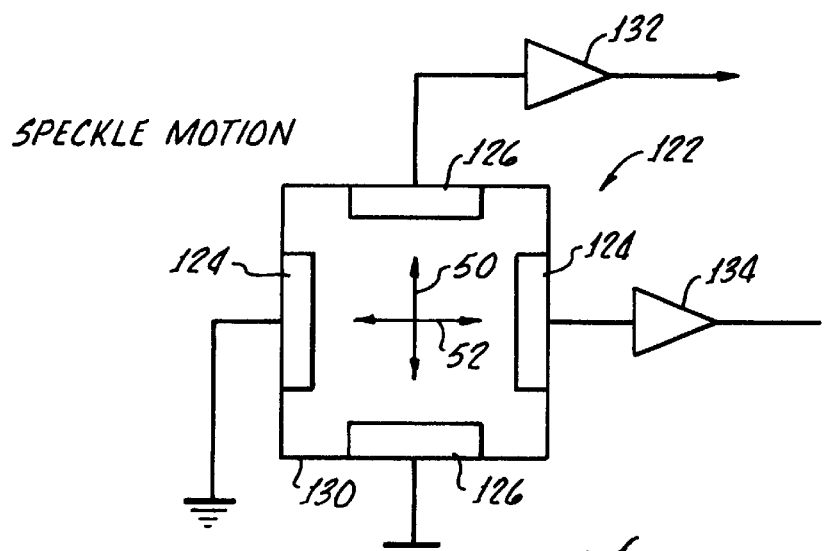
FIG. 5 is a schematic of one of the detectors shown in FIG. 4 illustrating orthogonally disposed opposing electrodes for providing outputs directly proportional to two orthogonal in-plane surface velocities.

An alternative embodiment 120 of the present invention is shown in FIG. 4, common reference numbers representing equivalent elements shown in FIG. 3. In this embodiment the two photo-EMF detectors 92, 94, shown in FIG. 3 are replaced by a single photo-EMF detector 122. As shown in FIG. 5, this detector 122 includes two pairs 124, 126 of opposing electrodes which are disposed orthogonally on a detector surface 130 for providing outputs proportional to two orthogonal in-plane surface velocities or displacements indicated by the arrows 50, 52 in FIG. 1 through amplifiers 132, 134.

Figure 6:
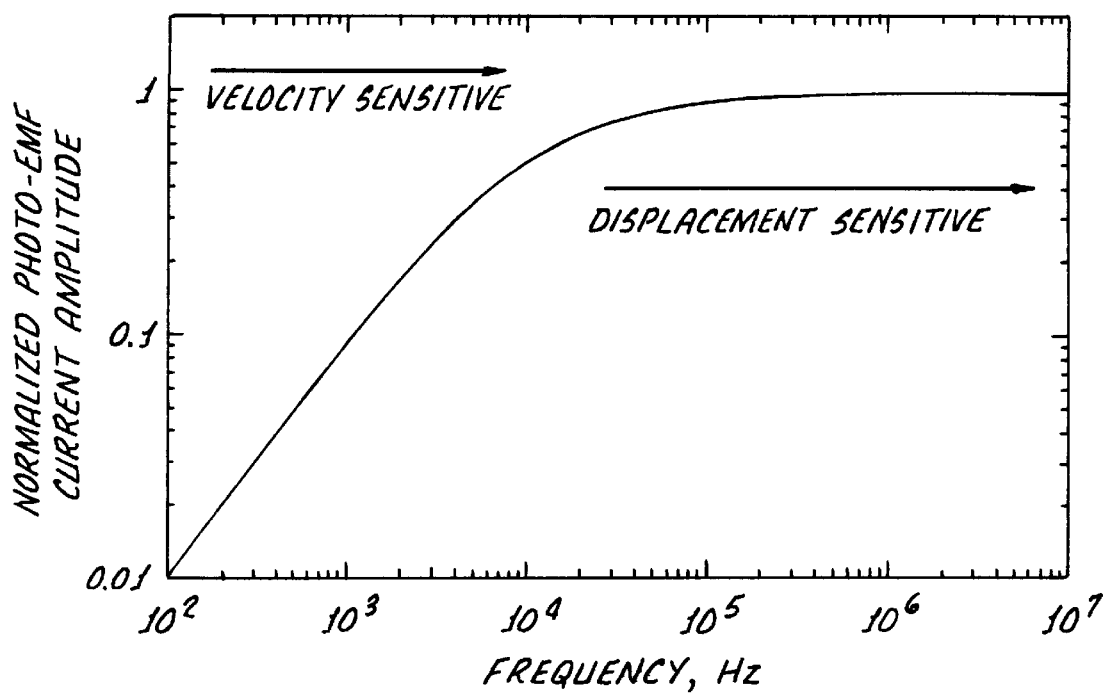
FIG. 6 is an idealized plot of normalized photo EMF current amplitude as a function of frequency at constant displacement amplitude, assuming a cutoff frequency of 10 kHz.

FIG. 6 is a plot of normalized photo-EMF current amplitude as a function of frequency for a fixed displacement amplitude. As shown at acoustic frequencies, the detector is sensitive to surface velocity and at ultrasonic frequency the detector is sensitive to surface displacement.

Figure 7:
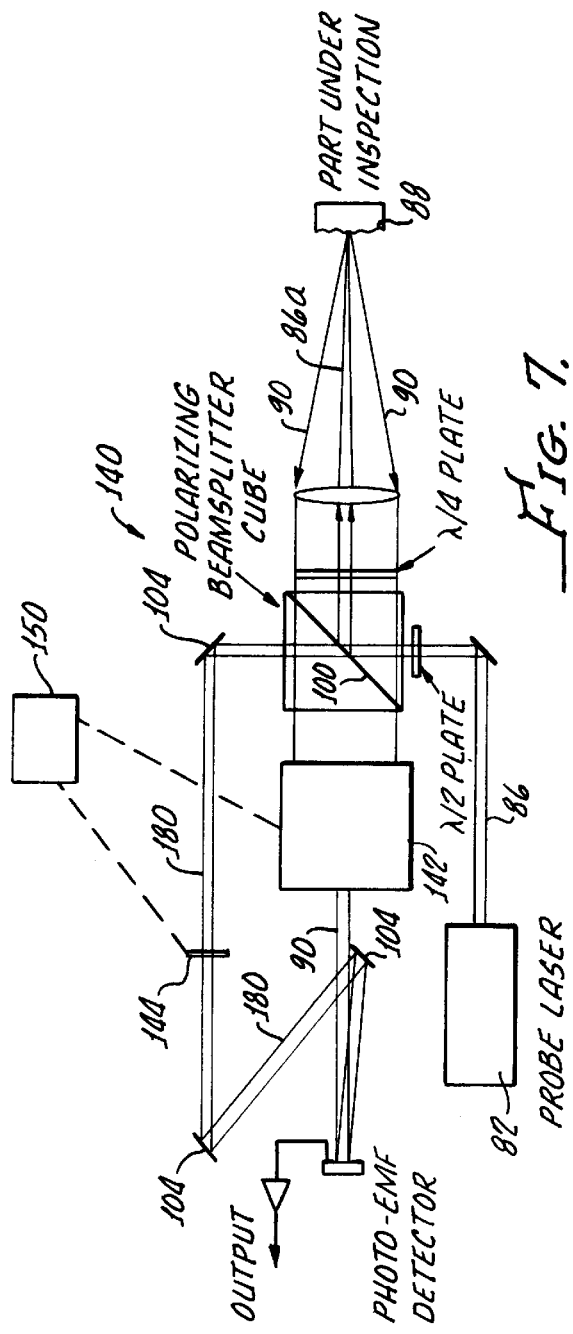
FIG. 7 is a schematic of an alternative embodiment of the present invention for providing sequential measurement of the surface in-plane and out-of-plane velocity and displacement.

Referring to FIG. 7, there is shown yet another embodiment 140 of the present invention for measuring surface velocity and displacement with common character references representing equivalent elements earlier as set forth and described in connection with FIGS. 3 and 4.

In this embodiment 140 second optic means 142 are provided and disposed in a position for intercepting the surface reflected laser beam 90 for alternatively forming an image plane at the photo-EMF detector 122 and a Fourier plane at the photo-EMF detector 122.

It has been unexpectedly found that when the photo-EMF detector 122 is disposed at a Fourier plane, the in-plane component of the signal from the detector 122 is substantially reduced.

However, for in-plane measurement of surface velocity and displacement, the detector 122 is preferably disposed at an image plane. Accordingly, using conventional optic lens techniques, the second optic means 142 can cause the detector 122 to be either in an image plane or a Fourier plane, without physical movement of the detector 122.

In this regard, switch means 144, are provided for optically blocking the reference beam portion 122 in order to enable the photo-EMF detector 122 to output signals directly proportional to two orthogonal combinations of in-plane surface velocity or displacement.

Thus, through the use of control means 150, the switch means 144 and second optical means 122 are operated in order to form an image plane at or near the photo-EMF detector while optically blocking the laser beam portion and forming a Fourier plane at or near the photo-EMF detector while not blocking the laser beam portion. In this manner the apparatus 140 sequentially operates to measure all three orthogonal components of surface velocity of displacement.

When the switch means 144 is closed, blocking the reference beam 102, and the detector 122, is effectively in an image plane, one set of electrodes 126 (see FIG. 5), provide a signal corresponding to in-plane velocity or displacement in one direction while another set of electrodes 124 provides a signal corresponding to another orthogonal in-plane surface velocity or displacement.

With the switch 144 open and the detector 122 in a Fourier plane, the one set of electrodes 126 provides an output, mainly comprised of out-of-plane surface velocity or displacement, while the crossed electrode 124 provides outputs for in-plane surface velocity or displacement. Thus, all three orthogonal components can be determined.

Figure 8:
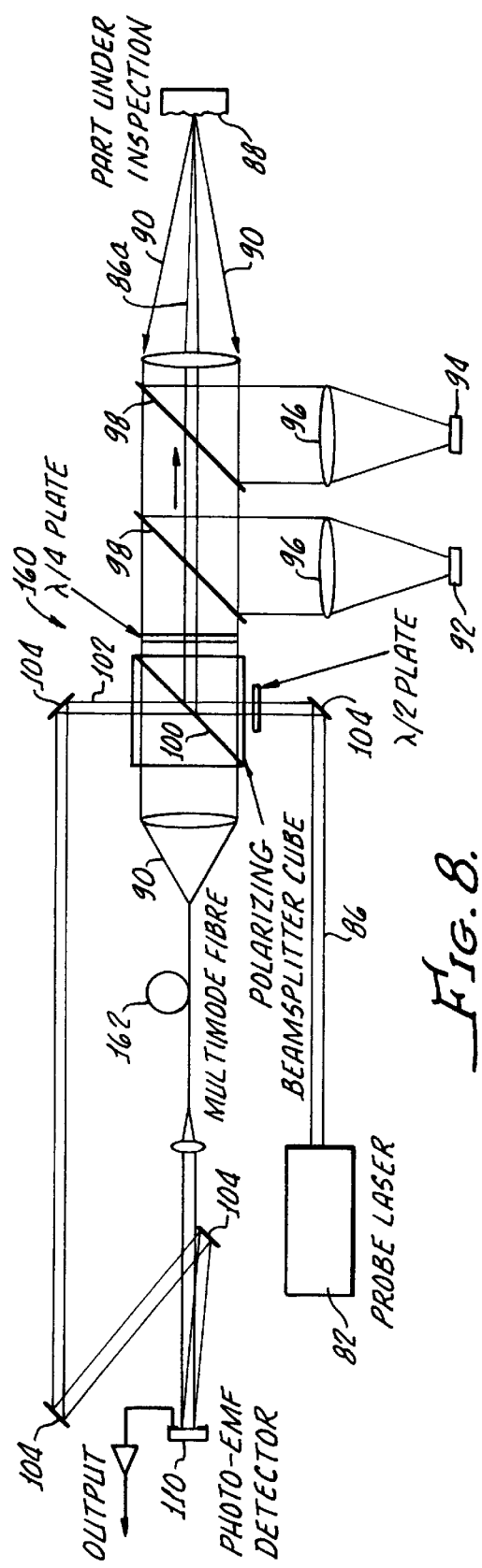
FIG. 8 is a schematic diagram of yet another embodiment in accordance with the present invention.

Turning now to FIG. 8, there is shown, in schematic format, another embodiment 160 in accordance with the present invention with common character references representing substantially similar components hereinbefore discussed in connection with FIGS. 3, 4 and 7.

In this embodiment 160 a multimode fiber 162 is included in the path of the signal beam 90 to the photo-emf detector 110. The fiber 162 relays changes in longitudinal phase associated with out-of-plane motion, but does not relay any transverse speckle motion associated with in-plane motion. Rather, transverse motion of the speckle pattern at the input face of the fiber 162 due to in-plane motion results in changes in the speckle pattern at the output (sometimes called "breathing"), without any associated lateral motion of the pattern. Thus, the multimode fiber 162 acts as a filter to eliminate any in-plane signal (for normal incidence), thereby allowing the measurement of purely out-of-plane motion. In this fiber embodiment 160, the photo-emf detector 110 can measure in-plane motion without having to be located at a Fourier plane.

A method in accordance with the present invention follows from the herein described apparatus and includes directing, at normal incidence, a single laser beam at a surface and providing a photo EMF detector and directing a surface scattered laser beam at one or more photo EMF detectors in order to provide outputs therefrom which are directly proportional to all three orthogonal components of surface velocity.

EXAMPLE

We have performed an experiment to demonstrate the remote measurement of in-plane and out-of-plane velocity at a single point on a vibrating surface. In order to provide for independent control of these two surface velocity components, we mounted a small loudspeaker on the end of a Wilcoxon Research F3/Z9 Electromagnetic Vibration Generator. The vibration generator (sometimes called a "shaker") produces axial motion at the end of a shaft, whose frequency and amplitude is determined by the frequency and amplitude of the electrical drive signal. The motion of the shaker shaft is measured with an integrated accelerometer and associated readout electronics. For sinusoidal drive, the velocity is equal to the measured acceleration divided by the radian frequency.

The loudspeaker in our experiment was mounted on the side of the shaft of the vibration generator. The point of laser interrogation was at the center of the speaker cone. In this setup, out-of-plane motion of the cone was produced by the speaker and in-plane motion of the cone was produced by the vibration generator. The speaker and shaker could be driven separately with little or not mechanical coupling, as long as the two drive frequencies were not harmonics of each other.

The setup we used was similar to that shown in FIG. 7. The interrogation beam 86*a* was incident normal to the surface of the speaker cone. The optics 142 were fixed so as to image the interrogated spot on the speaker surface 88 onto the photo-emf detector with a magnification of 20. As mentioned earlier, the imaging geometry with magnification is preferred for in-plane detection. For pure in-plane detection the reference beam 180 was blocked. For out-of-plane detection the reference beam was unblocked. We did not change the optics in the signal path for out-of-plane detection. Instead, we noted that the out-of-plane signal was approximately 10 times stronger than the in-plane signal, so for this demonstration the latter could be neglected.

Figure 9A:
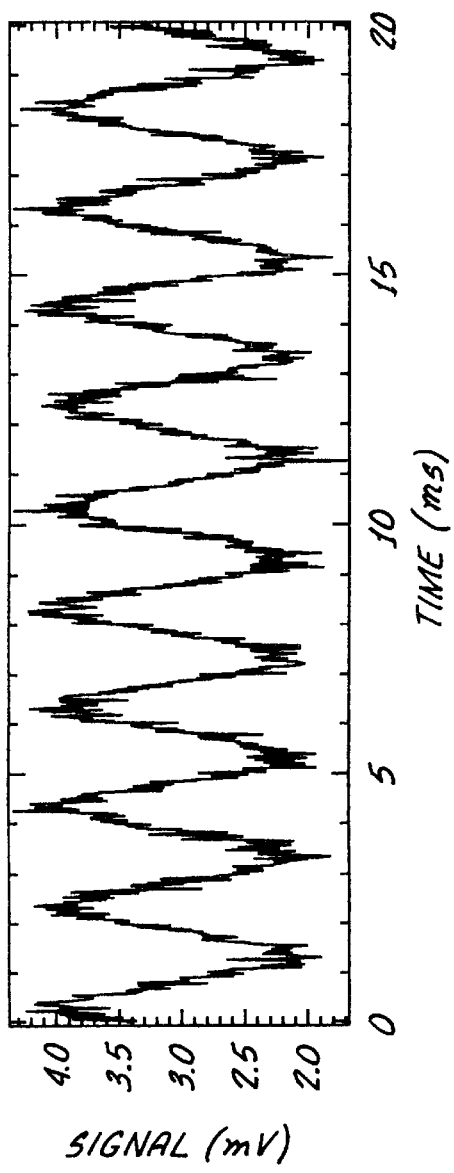
FIGS. 9A and 9B show in-plane and out-of-plane velocity signals taken at the same point on a test fixture using the same measurement apparatus.
Figure 9B:
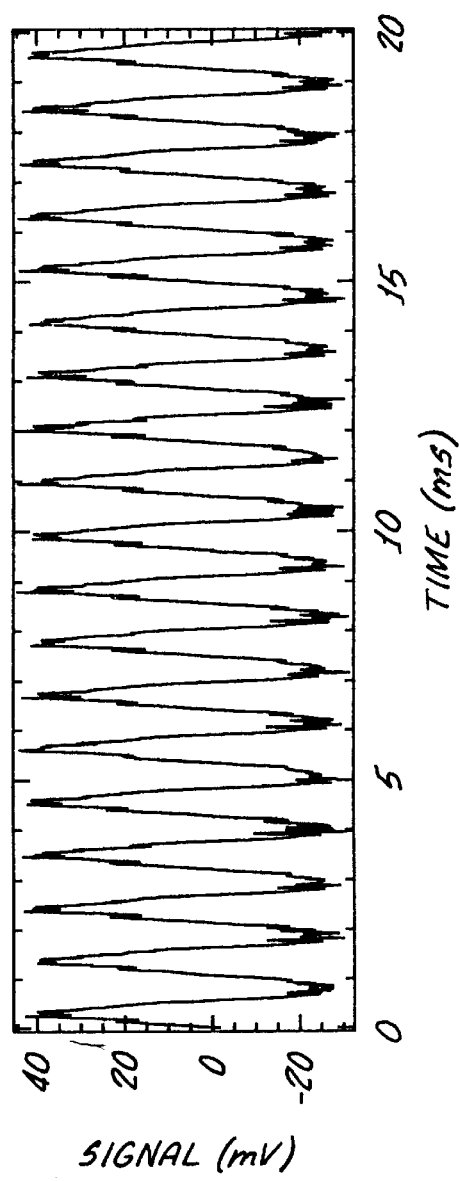

In FIGS. 9A and 9B, we show in-plane and out-of-plane signals acquired with our system. FIG. 9A shows the in-plane waveform at a drive frequency of 500 Hz. The surface velocity in this case was measured with the integrated accelerometer to be 3.1 mm/s rms. FIG. 9B shows the out-of-plane waveform at a drive frequency of 935 Hz. The surface velocity in this case was measured with a separate interferometer to be 17 mm/s rms. Note that each waveform was obtained without interference from the other. For a pure measurement of the out-of-plane signal with no potential interference from the in-plane signal, the optics 142 would be changed to place the photo-emf detector at a Fourier plane or a multimode fiber could be used in the signal path, as shown in FIG. 8.

Although there has been hereinabove described apparatus and methods in accordance with the present invention, for the purpose of illustrating the manner in which the invention may be used to advantage, it will be appreciated that the invention is not limited thereto. Accordingly, all modifications, variations or equivalent arrangements which may occur to those skilled in the art should be considered to be within the scope of the invention as defined in the appended claims.

What is claimed is:

1. Single beam laser apparatus for measuring surface velocity, at acoustic frequencies, and surface displacement, at ultrasonic frequencies, the apparatus comprising:

means for directing a single probe laser beam at a selected incidence to said surface;

at least one photo EMF detector;

means for directing a surface scattered laser beam at said photo EMF detector in order to enable said photo EMF detector to output signals therefrom which are directly proportional to a component of surface in-plane velocity at acoustic frequencies and a component of surface in-plane displacement at ultrasonic frequencies, said surface scattered laser beam being directed in a direction aligned with the direction of the probe laser beam.

2. The apparatus according to claim 1 wherein the selected incidence is normal to said surface.

3. The apparatus according to claim 1 wherein the photo EMF detector includes a detector surface having two pairs of opposing electrode means, disposed orthogonally, for providing the signals proportional to two orthogonal components of in-plane surface velocity or displacement.

4. The apparatus according to claim 3 further comprising a second photo-EMF detector and optic means, directing a portion of said single probe laser beam at said second photo-EMF detector along with the scattered laser beam, for providing a plane wave reference in order to enable the second detector to output a signal directly proportional to out-of-plane surface velocity or displacement.

5. The apparatus according to claim 4 further comprising filter means, disposed in front of the second hoto-EMF detector, for removing the components of in-plane surface velocity or displacement from the scattered laser beam.

6. The apparatus according to claim 5 wherein said filter means comprises a multimode optical fiber.

7. Single beam laser apparatus for measuring surface velocity, at acoustic frequencies, and surface displacement, at ultrasonic frequencies, the apparatus comprising:

means for directing a single probe laser beam at a selected incidence to said surface;

a first and a second photo EMF detector each having opposing electrode means for providing an output signal directly proportional to an in-plane component of velocity or displacement; and means for directing a surface scattered laser beam at each of the first and second photo EMF detectors, said surface scattered laser beam being directed in a direction aligned with the direction of the probe laser beam.

8. The apparatus according to claim 7 wherein the selected incidence is normal to said surface.

9. The apparatus according to claim 7 further comprising a third photo EMF detector and optic means, directing a portion of said single laser beam at said third photo EMF detector along with the scattered laser beam, for providing a plane wave reference in order to enable the third detector to output a signal directly proportional to out-of-plane surface velocity or displacement.

10. The apparatus according to claim 9 wherein said Fourier third detector is disposed at a Fourier plane defined by said optic means.

11. The apparatus according to claim 10 wherein the means for directing a surface scattered laser beam includes optical lens and the first and second photo EMF detector are disposed at an image plane of said optical lens.

12. The apparatus according to claim 11 wherein the optic means is configured to produce a magnification of the surface onto the first and second photo EMF detectors.

13. Single beam laser apparatus for measuring surface velocity, at acoustic frequencies, and surface displacement, at ultrasonic frequencies, the apparatus comprising:

means for directing a single probe laser beam at selected incidence to a surface;

a photo EMF detector, said photo EMF detector having outputs directly proportional to surface velocity at acoustic frequencies and output directly proportional to surface displacement at ultrasonic frequencies;

means for directing a surface scattered laser beam at said photo EMF detector, said surface scattered laser beam being directed in a direction aligned with the direction of the probe laser beam;

optic means for directing a portion of said single laser beam at the photo EMF detector for providing a plane wave reference thereto in order to enable the photo EMF detector to output a signal directly proportional to out-of-plane surface velocity or displacement;

switch means for optically blocking the laser beam portion in order to enable the photo EMF detector, to output signals directly proportional to a component of in-plane surface velocity or displacement.

14. The apparatus according to claim 13 wherein the selected incidence is normal to said surface.

15. The apparatus according to claim 14 further comprising second optic means, disposed in a position intercepting said surface scattered laser beam, for alternatively forming an image plane at said photo EMF detector and a Fourier plane at said photo EMF detector.

16. The apparatus according to claim 15 wherein the optic means is configured to produce a magnification of the surface onto the photo EMF detector.

17. The apparatus according to claim 16 further comprising control means for operating said switch means and said second optic means in order to form a Fourier plane at the photo EMF detector while optically blocking the laser beam portion and form an image plane at the photo EMF detector while not blocking the laser beam portion.

18. The apparatus according to claim 17 wherein said photo EMF detector includes a detector surface having two pairs of opposing electrode means, disposed orthogonally, for providing signals directly proportional to two orthogonal components of in-plane surface velocity or displacement.

* * * * *